US005912424A

United States Patent [19]

Judkins et al.

[11] Patent Number: 5,912,424

[45] Date of Patent: Jun. 15, 1999

[54] ELECTRICAL SWING ADSORPTION GAS STORAGE AND DELIVERY SYSTEM

[75] Inventors: Roddie R. Judkins, Knoxville; Timothy D. Burchell, Oak Ridge, both of Tenn.

[73] Assignee: Lockheed Martin Energy Research Corporation, Oakridge, Tenn.

[21] Appl. No.: 08/825,507

[22] Filed: Mar. 31, 1997

[51] Int. Cl.[6] .......... B01D 53/04

[52] U.S. Cl. .......... 95/143; 95/148; 96/143; 96/153

[58] Field of Search .......... 96/108, 121, 126–130, 96/143, 146, 27, 154, 153, 135, 136, 139; 95/90, 136, 139, 148, 114–116, 61, 143, 141

[56] References Cited

U.S. PATENT DOCUMENTS

| | | | |
|---|---|---|---|
| 3,608,273 | 9/1971 | Fabuss et al. | 95/148 |
| 3,768,232 | 10/1973 | Farber et al. | 96/146 X |
| 4,028,069 | 6/1977 | Nolley, Jr. et al. | 95/139 X |
| 4,038,050 | 7/1977 | Lowther | 96/146 X |
| 4,094,652 | 6/1978 | Lowther | 96/143 |
| 4,101,296 | 7/1978 | Lowther | 95/148 X |
| 4,312,641 | 1/1982 | Verrando et al. | 96/126 X |
| 4,322,394 | 3/1982 | Mezey et al. | 95/148 X |
| 4,737,164 | 4/1988 | Sarkkinen | 95/148 X |
| 4,790,859 | 12/1988 | Marumo et al. | 95/139 X |
| 5,308,457 | 5/1994 | Dalla Betta et al. | 95/148 X |
| 5,505,825 | 4/1996 | Gold et al. | 95/148 X |

FOREIGN PATENT DOCUMENTS

| | | | |
|---|---|---|---|
| 0 517 189 A1 | 12/1992 | European Pat. Off. . | |
| 0 727 608 A2 | 8/1996 | European Pat. Off. . | |
| 2659869 | 9/1991 | France | 95/148 |
| 3515207 | 10/1985 | Germany | 95/139 |
| 92 02 545 | 6/1992 | Germany . | |
| 55-3871 | 1/1980 | Japan | 95/136 |
| 5253478 | 10/1993 | Japan . | |
| WO94/01714 | 1/1994 | WIPO . | |
| WO96/09887 | 4/1996 | WIPO . | |

OTHER PUBLICATIONS

Neat Fibers, pp. 1–3, posted Apr. 1996; publications/lab-notes/Apr. 96/sieve.htm.

Porosity in Carbons: Characterization and Applications, John W. Patrick ed., pp. 292–325, 1995, published by Halsted Press.

A Novel Approach to the Removal of $CO_2$, T.D. Burchell, R.R. Judkins, M.R. Rogers and A.M. Williams, Oak Ridge National Laboratory, pp. 135–148, published Aug. 1996.

"Passive $CO_2$ Removal Using a Carbon Fiber Composite Molecular Sieve" Timothy D. Burchell and Roddie R. Judkins, Oak Ridge National Laboratory, *Energy Convers. Mgmt* vol. 37, Nos. 6–8, pp. 947–954, 1996.

Masahiro, H., "Desorption Method of Adsorbed Chemical Material", Patent Abstracts of Japan, vol. 018, No. 456, Aug. 25, 1994 (JP 06 142432 A, May 24, 1994).

*Primary Examiner*—Richard L. Chiesa
*Attorney, Agent, or Firm*—Wilson, Sonsini, Goodrich & Rosati

[57] ABSTRACT

Systems and methods for electrical swing natural gas adsorption are described. An apparatus includes a pressure vessel; an electrically conductive gas adsorptive material located within the pressure vessel; and an electric power supply electrically connected to said adsorptive material. The adsorptive material can be a carbon fiber composite molecular sieve (CFCMS). The systems and methods provide advantages in that both a high energy density and a high ratio of delivered to stored gas are provided.

17 Claims, 5 Drawing Sheets

ELECTRICAL SWING ADSORPTION GAS STORAGE AND DELIVERY SYSTEM

STATEMENT AS TO RIGHTS TO INVENTIONS MADE UNDER FEDERALLY-SPONSORED RESEARCH AND DEVELOPMENT

This invention was made with United States government support awarded by the United States Department of Energy under contract DE-AC05-96OR22464 to Lockheed Martin Energy Research Corporation. The United States has certain rights in this invention.

BACKGROUND OF THE INVENTION

1. Field of the Invention

The present invention relates generally to the field of gas storage systems. More particularly, the present invention relates to gas storage systems that are based on materials that adsorb gas. Specifically, a preferred implementation of the present invention relates to a system that uses a carbon fiber composite molecular sieve (CFCMS) material for gas adsorption. In this implementation, desorption of the previously adsorbed gas is achieved by passing an electrical current through the CFCMS material. The present invention thus relates to a gas storage system of the type that can be termed electrical swing adsorption.

2. Discussion of the Related Art

Historically, natural gas has been an important primary energy source and is one of the cleanest burning fossil fuels. It is becoming increasingly important as a competitor for liquid transportation fuels such as diesel, gasoline and alcohol (e.g., methanol and ethanol). The two disadvantages, in comparison with liquid fuels, most often cited with regard to natural gas are, first, the expense of transporting it from the site of production to its point of use and, second, its low energy density, both per unit mass and per unit volume.

For use as a vehicle fuel, the low energy density disadvantage can be partially overcome by the use of compressed natural gas (CNG). For example, a pressure vessel can be filled with compressed natural gas at pressures as high as 250 atm. Another way to address the low energy density disadvantage issue is by the use of liquified natural gas. However, a problem with the use of either of these techniques is that they both impose considerable additional costs. Thus, there is a need for a storage and delivery system in which equivalent amounts of gas could be stored at moderate pressures (e.g., 20–25 atm) and at moderate temperatures (e.g., 10–30° C.) while still maximizing the amount of natural gas that can delivered to the vehicle from a fuel tank of a given size and weight.

Moreover, another previously recognized problem with the compressed natural gas approach is that all vehicles are subject to mishaps. While gasoline, and to a lesser extent diesel, fuels present a fire and/or detonation hazard in a collision, a high pressure vessel containing compressed natural gas represents a more significant fire and/or detonation hazard. Therefore, there is also a need for a high energy density natural gas storage system that is less hazardous than compressed natural gas.

A previously recognized solution has been the use of granular activated carbons and adsorption/desorption techniques such as pressure swing adsorption and thermal swing adsorption.(1) In pressure swing adsorption (PSA) or temperature swing adsorption (TSA) systems, gases are desorbed by lowering the pressure (or increasing the temperature) of the adsorbent system (thus, the system "swings" from a high to low pressure or a low to high temperature). However, a serious drawback to both of the PSA and TSA techniques is that they impose undesirable conditions on the system. More specifically, the PSA technique imposes the cycling of pressure between adsorption and desorption (i.e., high-low). Similarly, the TSA technique imposes the cycling of temperature between adsorption and desorption (i.e., low-high). Thus, a need exists for a simpler and more effective technique that will result in desorption of most, if not all, of the stored gas without the need for drastic system condition variations.

Moreover, another drawback to the PSA and TSA techniques is that they suffer from an inability to deliver all the adsorbed gas. Complicating factors include the shape of the methane adsorption isotherm at ambient temperatures and effects of adsorption enthalpy. The ideal adsorbent would show complete reversibility, (i.e., high uptake and complete desorption). In practice, most adsorbents cannot be completely desorbed and thus will have a residual gas content. A compromise approach is often taken to try to optimize the ratio of stored-to-deliverable gas. Considerable advantage would be gained by a desorption process which results in delivery of all, or almost all, of the stored gas.

Within this application several publications are referenced by superscripts composed of arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

SUMMARY OF THE INVENTION

Therefore, there is a particular need for a gas adsorption system based on materials that exhibit high adsorption and good reversibility and which operate by electrical swing adsorption/desorption at relatively low pressures and relatively low temperatures. Thus, it is rendered possible to simultaneously satisfy the above-discussed requirements of high energy density, high ratio of delivered gas to stored gas, and improved safety which, in the case of the prior art, are mutually contradicting and cannot be simultaneously satisfied.

These, and other, aspects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore nonlimiting, embodiments illustrated in the drawings accompanying and forming a part of this specification, wherein like reference numerals designate the same elements in the several views. It should be noted that the features illustrated in the drawings are not necessarily drawn to scale.

DESCRIPTION OF PREFERRED EMBODIMENTS

The present invention and the various features and advantageous details thereof are explained more fully with reference to the nonlimiting embodiments that are illustrated in the accompanying drawings and detailed in the following description. Descriptions of well known components and processing techniques are omitted so as to not unnecessarily obscure the present invention in detail.

The entire contents of U.S. patent application Ser. No. 08/747,109, filed Nov. 8, 1996, which discloses a monolithic carbon fiber composite molecular sieve material, are hereby expressly incorporated by reference into the present application. The entire contents of U.S. patent application Ser. No. 08/601,672, filed Feb. 15, 1996, which discloses a gas separation device based on electrical swing adsorption, are also hereby expressly incorporated by reference into the present application.

System Overview

The invention can be utilized for the storage of many different gases, such as, for example, natural gas, or any combination of the constituent molecules thereof (e.g., methane, ethane, etc.). The invention can operate below pressures of from approximately 30 atm to approximately 50 atm, while obtaining energy densities comparable to conventional compressed natural gas systems which are typically charged to pressures of approximately 200–250 atm. In the invention, the gas is stored by physical adsorption with an adsorptive material. Desorption of the gas for delivery to, for example, an engine, is by the application of electric current to the adsorptive material.

The invention also includes the activation of a carbon fiber composite molecular sieve adsorptive material to maximize the storage capacity for methane. Activation can be conducted to provide the optimum combination of surface area, pore volume, and pore size for adsorption of methane. This optimum combination of properties will result in the methane being adsorbed on the adsorptive material.

Apparatus

Figure 1:
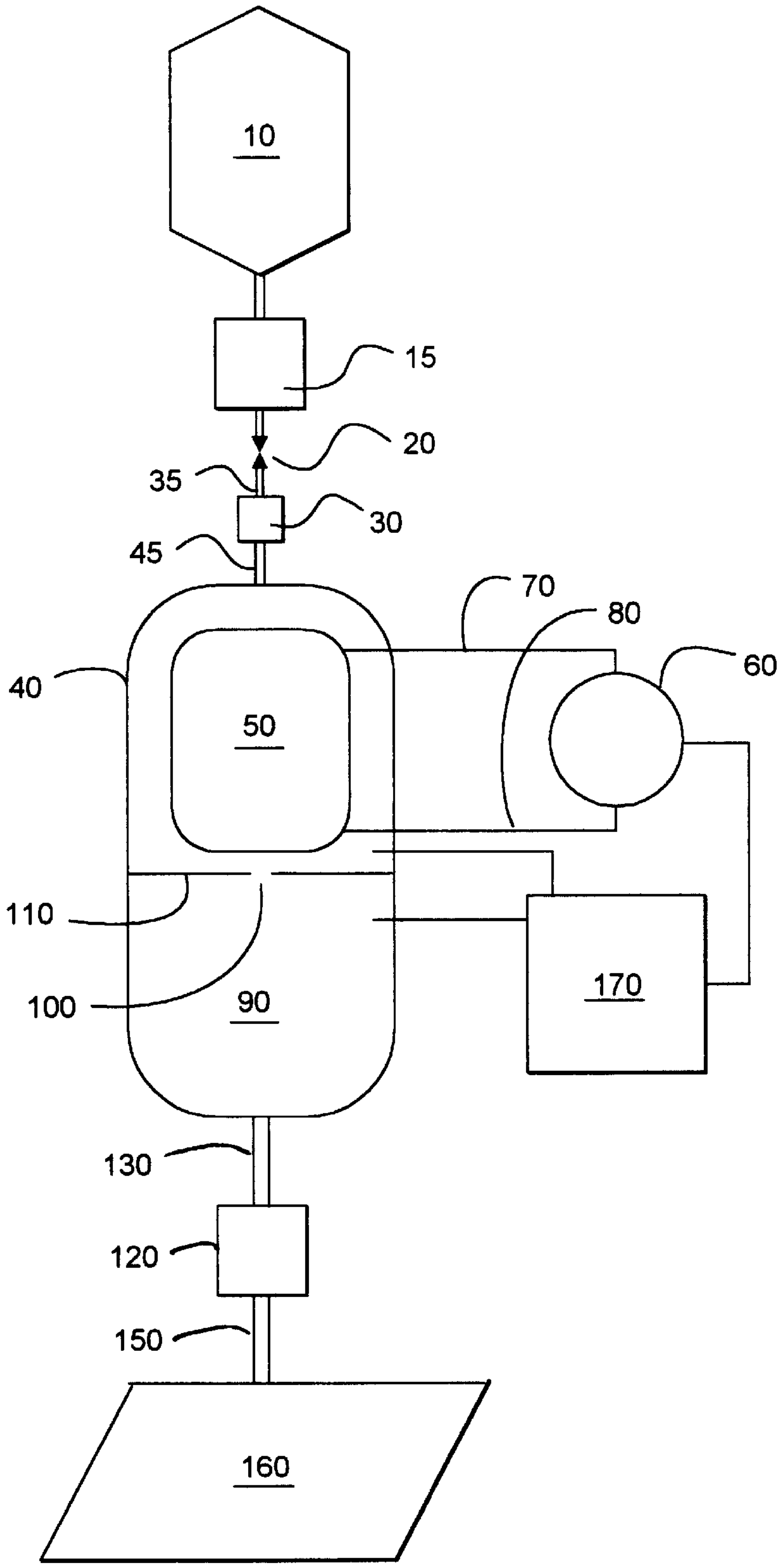
FIG. 1 illustrates a high level block diagram of an electrical swing adsorption gas storage system, representing an embodiment of the present invention.

Referring to FIG. 1, an implementation of a natural gas storage system will be described in some detail. A source of natural gas 10 is removably attached to a coupling 20 via a first valve 15. The coupling 20 can be configured so as to permit the repeated attachment and detachment of the source of natural gas 10 without tools. The coupling 20 is connected to a second valve 30 via a first conduit 35. The second valve 30 is connected to a pressure vessel 40 via a second conduit 45. Together, the coupling 20, the first conduit 35, the second valve 30 and the second conduit 45 can be termed an input manifold. In this way, gas from the source of natural gas 10 can be supplied to the interior of the pressure vessel 40.

An adsorptive material 50 is located within the pressure vessel 40. The adsorptive material 50 is an electrically conductive gas adsorptive material. In a preferred embodiment, the adsorptive material 50 includes a continuous (monolithic) solid carbon fiber composite molecular sieve (CFCMS), which will be discussed below in more detail. The adsorptive material 50 can be made from carbon fiber composite molecular sieve material manufactured at the Oak Ridge National Laboratory in Oak Ridge, Tenn., from isotropic pitch fibers available from Ashland Chemical Co. and available by the trade designation "P200" pitch fibers.

As gas enters the interior of the pressure vessel 40 from the source of natural gas 10, the adsorptive material 50 adsorbs natural gas. By closing either the first valve 15, or the second valve 30, the process of adsorption can be terminated when, or before, the adsorptive material 50 becomes saturated with natural gas.

The adsorptive material 50 is connected to an electric power supply 60 via conductive leads 70 and 80. By applying a voltage across leads 70 and 80, a circuit is established through the adsorptive material 50. The power supply 60 can be a direct current power supply. In preferred embodiments, the power supply 60 includes a variable voltage regulator.

The power supply 60 can be any conventional type, such as one that produces on a selective basis 0–20 volts. Desorption can be accomplished by setting the power supply at 1 volt and between 4–5 amps, although these numbers are non-limiting examples.

While not being bound by theory, it is believed that ohmic resistance within the adsorptive material causes a rise in temperature that in-turn causes desorption of the previously adsorbed natural gas. In more detail, it is believed that the ohmic heating causes i) excitation of methane molecules which are adsorbed on the monolithic carbon fiber composite molecular sieve and/or ii) negation of the dispersion bonds of attraction, thus causing rapid desorption of the methane. The electricity may have other effects on the carbon fibers.

Still referring to FIG. 1, the pressure vessel 40 is connected to a low pressure tank 90 via a check valve 100 in a bulkhead 110. The interior of the low pressure tank 90 is connected to a third valve 120 via a third conduit 130. The third valve 120 can include a pressure regulator. The third valve 120 is connected to a natural gas utilizing device 160 via a fourth conduit 150. The natural gas utilizing device 160 can be an internal combustion engine, a gas turbine or a solid oxide fuel cell. Together, the third conduit 130, the third valve 120 and the fourth conduit 150 can be termed an output manifold.

A control system 170 is connected to power supply 60. The control system functions to control the power supply 60 and receives pressure data from the pressure vessel 40, the low pressure tank 90 and the third valve 120 via transducer leads.

Thus, FIG. 1 can be said to illustrate a two-chamber storage vessel in which a high pressure primary storage chamber (pressure vessel 40) contains a monolith of CFCMS and stored gas, and a low pressure secondary chamber (low pressure tank 90) maintains a supply of gas at a utilization pressure for delivery to an engine (device 160). The two chambers are connected by the check valve 100 to assure unidirectional flow (e.g., from the primary storage chamber to the secondary chamber). In operation, the applied voltage, and current flow, would be maintained until a desired primary storage chamber system pressure was reached. As gas from the primary storage chamber is removed and transported to the secondary chamber, and thence to the third valve 120 for use, the primary storage vessel pressure falls. In a preferred embodiment of the invention, this indicates the need to apply a voltage, resulting in current flow and an increase in gas pressure in the primary storage vessel pressure. Consequently, more gas passes into the secondary chamber, thereby maintaining the supply to the third valve 120.

In a preferred embodiment, the pressure vessel 40 contains CFCMS and is filled with natural gas or methane to a desired pressure, thereby determining the amount of gas stored. During desorption, delivery of the gas is accomplished by a controlled low voltage current flow through the CFCMS. Pressure regulators and valve systems (not shown) may be employed to adjust the pressure and volume delivered to the engine, for example, based on the demand of the engine for fuel.

The embodiment described above is based on the storage and delivery of methane or natural gas. In general, the invention applies to any and all gas storage and/or delivery systems. The invention can be applied to any of these systems in which an adsorbent is electrically conductive.

In some embodiments, it may be desirable to provide a guard bed to protect an adsorbed natural gas tank (pressure vessel 40) from contaminants in the feed gas. Such a guard bed can be considered to be part of conduit 45 and can include an activated carbon fiber composite that is optimized for the adsorption of contaminants (e.g., CO).(2) This activated carbon could be regenerated by passing a current through the activated carbon in the same way that the adsorptive material is desorbed.

In some embodiments, it may be desirable to provide a fuel emission trap to minimize loss when coupling 20 is disconnected. Such a trap can be considered to be part of the conduit 35 and can include activated carbon that is optimized for the adsorption of natural gas. When saturated, this activated carbon could be purged for reuse by passing a current through the activated carbon in the same way that the adsorptive material is desorbed.

Carbon Fiber Composite Molecular Sieve

Figure 2:
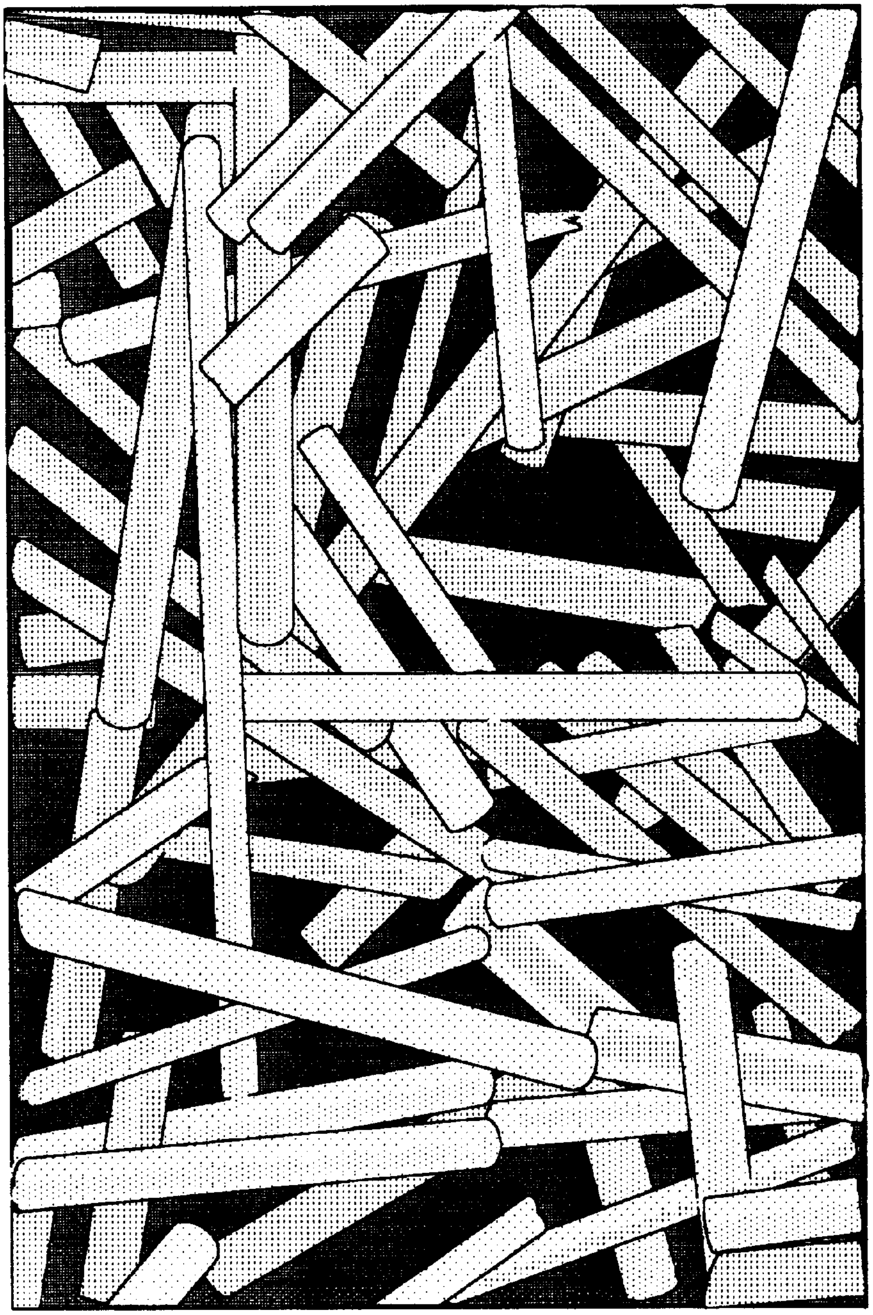
FIG. 2 illustrates a scanning electron microscope image of a carbon fiber composite molecular sieve, representing an embodiment of the present invention.

Referring now to FIG. 2, the carbon fiber composite molecular sieve includes porous carbon fibers and a binder. The carbon fibers are bonded where they touch to form a rigid, monolithic, open and highly permeable structure. The carbon fibers can be bonded with carbonized resin so that the composite material conducts heat and electricity extremely well. Typically, the carbon fibers are from approximately 6 microns to approximately 20 microns in diameter. The carbon fiber composite molecular sieve is designed for controlled porosity and can have a surface area greater than 1000 $m^2/g$. Further, the carbon fiber composite molecular sieve is strong and relatively rigid allowing gases (or more generally fluids) to easily flow through the composite. When activated, the carbon fibers provide a microporous structure that defines a high surface area for adsorption of the gas(es) of interest.

Synthesis of the carbon fiber composite molecular sieve can include mixing a selected carbon fiber in a water based slurry with a carbonizable organic powder. The desired monolith configuration is molded from the slurry. The resulting green form is dried and removed from the mold. The composite is cured prior to carbonization under an inert gas. After it is carbonized, the composite is readily machined to the desired final configuration. The composite material is then activated to develop the pore structure.

Carbon fibers derived from coal tar pitch, rayon, polyacrylonitrile (PAN) or heavy oils such as oil shale residue and refinery residue can be utilized in the production of the composite. Alternatively, the fibers can be vapor grown. The choice of the fibers, or a blend of different carbon fibers, can be utilized to control the characteristics of the resultant carbon fiber composite. More specifically, the strength, thermal conductivity, pore size distribution, density and electrical properties are examples of the characteristics that can be modified or controlled with the appropriate carbon fiber or blend of carbon fibers. These properties can also be modified or controlled with appropriate processing.

By selecting a different carbon fiber and altering selected parameters in the production process, the carbon fiber composite can be modified for use in a variety of applications. For example, the carbon fiber composite can be optimized for adsorption of methane, ethane, propane, butane, pentane, hexane, or other aliphatic, as well as cyclic, hydrocarbons.

For use as an adsorbent of the alkanes, it is preferable to use carbon fibers derived from a suitable isotropic pitch precursor. As is well known, this type of pitch can be derived from heavy petroleum fractions.

In a preferred embodiment, the isotropic pitch precursor is formed by spinning such that the resultant fibers define a diameter of from approximately 10 to approximately 25 microns. The fibers can be in a stabilized or carbonized condition. The fibers can be cut to a selected size. In a preferred embodiment, the fibers are cut to an average length of approximately 400 microns and can range in length from approximately 100 to approximately 1000 microns.

Fiber forming methods include melt spinning and melt blowing. During both of these processes, the pitch is melted to a carefully controlled viscosity then forced through a number of fine capillaries to produce fibers as the pitch resolidifies. In the melt spinning process the fiber diameter is controlled by drawing the fibers down and winding them onto a reel as they form. The melt blowing process employs a stream of air which draws the fibers down as it blows them onto a moving belt to form a random mat of "green" pitch fibers. In both methods, extreme care must be taken to control the temperature and other conditions. Once formed, the green fibers are "stabilized," by heating the fibers in an oxidizing atmosphere, so that they are rendered thermosetting and will retain their fibrous form at the high temperatures used in the subsequent carbonization step. After carbonization, the fiber mats contain about 95% carbon by weight.

The chopped carbon fibers are mixed in a water slurry with a carbonizable organic powder, such as pitch, thermosetting resin or phenolic resin. In a preferred embodiment, powdered phenolic resin is utilized.

However, the particular material selected for the bonding material, or the fiber material, is not essential to the present invention, so long as it provides the described function. Normally, the makers of the invention will select the best commercially available material based upon the economics of cost and availability, in view of the expected application requirements of the final product and the demands of the overall manufacturing process.

A preferred composite forming method is vacuum molding, where the slurry is transferred to a molding tank and the water is drawn through a porous mold under vacuum. The material can be molded into any configuration desired such as a cylinder or plate. The configuration will be determined by the configuration of the mold into which the slurry is transferred. Other methods of forming can be utilized such as pressure forming or various forming methods practiced in the plastics industry.

However, the particular manufacturing process used for forming the composite, or the carbon fibers themselves, is not essential to the present invention as long as it provides the described transformation. Normally the makers of the invention will select the manufacturing process based upon tooling and energy requirements, in view of the expected application requirements of the final product and the demands of the overall manufacturing process.

After forming the composite, the resulting green form is dried. In a preferred embodiment, the green form is dried in air at approximately 50° C. Once dried, the form is removed from the mold. The dried green form is then cured to produce a cured monolith. In a preferred embodiment, the composite is cured at approximately 130° C. in air. The resulting composite can be carbonized under an inert gas. In a preferred embodiment, the composite can be carbonized for approximately 3 hours under nitrogen at approximately 650° C. to pyrolize the resin binder.

The composite formed by the above process defines voids between the fibers (interfiber pores) which allow free flow of gases, or fluids, through the material. This provides the molecules of the gas, or fluid, with ready access to the carbon fiber surface. The voids can range from approximately 10 to approximately 500 microns in size. The individual carbon fibers are held in place by the pyrolized resin binder and thus cannot move or settle due to the flow of gases through the material. The carbonized bulk density of the composite material is typically from approximately 0.3 to approximately 0.4 g/cm$^3$. Assuming a theoretical density of 2.26 g/cm$^3$ (density of a single crystal pure graphite) for the composite of the present invention, at a density of 0.3–0.4 g/m$^3$, the composite would include from approximately 82% to approximately 86% porosity.

Following its manufacture, the monolithic carbon fiber composite is activated. Activation of the carbon fibers can be accomplished by steam, carbon dioxide, oxygen or chemical activation. The resulting chemical reactions (notably oxidation) removes carbon from the surface of the carbon fibers and develops pores in the fibers. These pores can be classified by diameter: micropores (less than 2 nm); mesopores (2–50 nm); and macropores (greater than 50 nm).

In one embodiment, the composite is steam activated in a steam/nitrogen atmosphere. In this embodiment, the activation conditions are: from approximately 800 to approximately 950° C., steam at a partial pressure of from approximately 0.1 to approximately 0.9 atmospheres and for a duration of from approximately 1 to approximately 3 hours. Under these conditions, the activation can be termed a burn-off. The surface of the carbon fibers is oxidized and parts thereof are literally burned-off. A characteristic burn-off percentage is calculated from the initial and final weights. Up to approximately 60% burn-off, the surface area increases with burn-off. However, too high a burn-off can result in a reduction in the strength of the composite. Using the manufacturing process described herein, the reduction of crush strength of the composite is almost linear with burn-off, rather than the strong exponential dependance more typically exhibited by thermally oxidized carbons. At 50% burn-off, the Brunauer, Emmett and Teller (BET) $N_2$ surface area can be approximately 1670 m$^2$/g. A crush strength of approximately 1 MPa is retained after activation. The resultant fibers in the composite define a high micropore volume, a low mesopore volume and no macropores.

Activation is performed, for carbon dioxide adsorption, at 850° C. for 6–18 hours in saturated ($H_2O$) helium. The BET surface area of such a material, determined from nitrogen adsorption, ranges from 200 to 2,000 m$^2$/g.

The activation conditions can be varied by changing the activation gas, its concentration, the flow rate, the temperature and the optional presence of a catalyst to influence total surface area and pore size distribution.

The system can use CFCMS that has been specifically activated for high selectivity of natural gas. Further, the use of post activation treatments can be implemented. For example, further heating or the introduction of chemicals affects the pore size distribution and surface chemistry. After carbonization or activation, the composite can be further machined to any desired shape, forming a monolithic carbon fiber composite.

The resultant activated carbon fiber composite is well suited for use as an adsorbent or molecular sieve in the electrical swing adsorption (ESA) process, or the pressure swing adsorption (PSA) process, or the thermal swing adsorption (TSA) process. It has a very high surface area, a narrow micropore distribution centered around mean pore sizes of from approximately 5 to approximately 10 angstroms, a high micropore volume, low mesopore volume, a high gas adsorption/desorption rate, and a permeable macrostructure through which fluid can easily pass. Further, because the carbon fiber composite is a monolith, it overcomes the settling problems associated with beds of granular activated carbon and carbon molecular sieves and thus bypass flows and excessive pressure drops are eliminated. Moreover, the mean micropore size is controllable through the activation process thus allowing for the carbon fiber composite to be tailored for adsorption or sieving of specific gas molecules. The density and void size of the carbon fiber composite can be altered by varying the fiber length, binder content and molding conditions.

For example, a carbon fiber composite with a bulk density greater than 1 g/cm$^3$ and an active surface area greater than 1000 m$^2$/g can be used for gas storage. Such a composite could be utilized as a $CH_4$ or $H_2$ storage medium or as a $CH_4$ purification medium for processing of $CH_4$ from various sources, including land fill gases or coal bed gas. A mesoporous carbon fiber composite is also suitable for use in liquid phase applications or as a catalyst support.

Desorption of the $CH_4$ from such an adsorbent with these characteristics would be difficult, or energy intensive, to achieve by standard techniques such as the pressure swing and temperature swing processes. However, the desorption technique of the present invention, which can be termed electrical swing adsorption, is a low energy input process that is well suited to desorption of carbon fiber composites.

There is a direct relationship between the applied voltage and the rate of desorption. These results are expressed in the following table:

| Cycle | Desorption Time (min.) | Voltage | Current (Amps) | Power (W) |
|---|---|---|---|---|
| 1 | 13 | 1.0 | 4.45 | 4.45 |
| 2 | 20 | 0.5 | 2.187 | 1.085 |
| 3 | 20 | 0.5 | 2.18 | 1.094 |
| 4 | 30 | 0.1 | 0.43 | 0.043 |

The laboratory results recited in the table were obtained using adsorption members measuring three inches in length and one inch in diameter. The passage of the electrical current therethrough resulted in heating of the carbon fiber experimental adsorption members to approximately 50° C.

The invention can be applied to any gas storage systems in which the adsorbent is electrically conductive. The invention can be applied as an electrical swing adsorption technique, or it can be combined as an enhancement with pressure swing and/or temperature swing techniques.

While not being limited to any particular performance indicator or diagnostic identifier, preferred embodiments of the present invention can be identified one at a time by testing for the presence of high porosity. The test for the presence of high porosity can be carried out without undue experimentation by the use of a simple and conventional Brunauer, Emmett and Teller (BET) experiment.

EXAMPLES

Specific embodiments of the present invention will now be further described by the following, nonlimiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Figure 3:
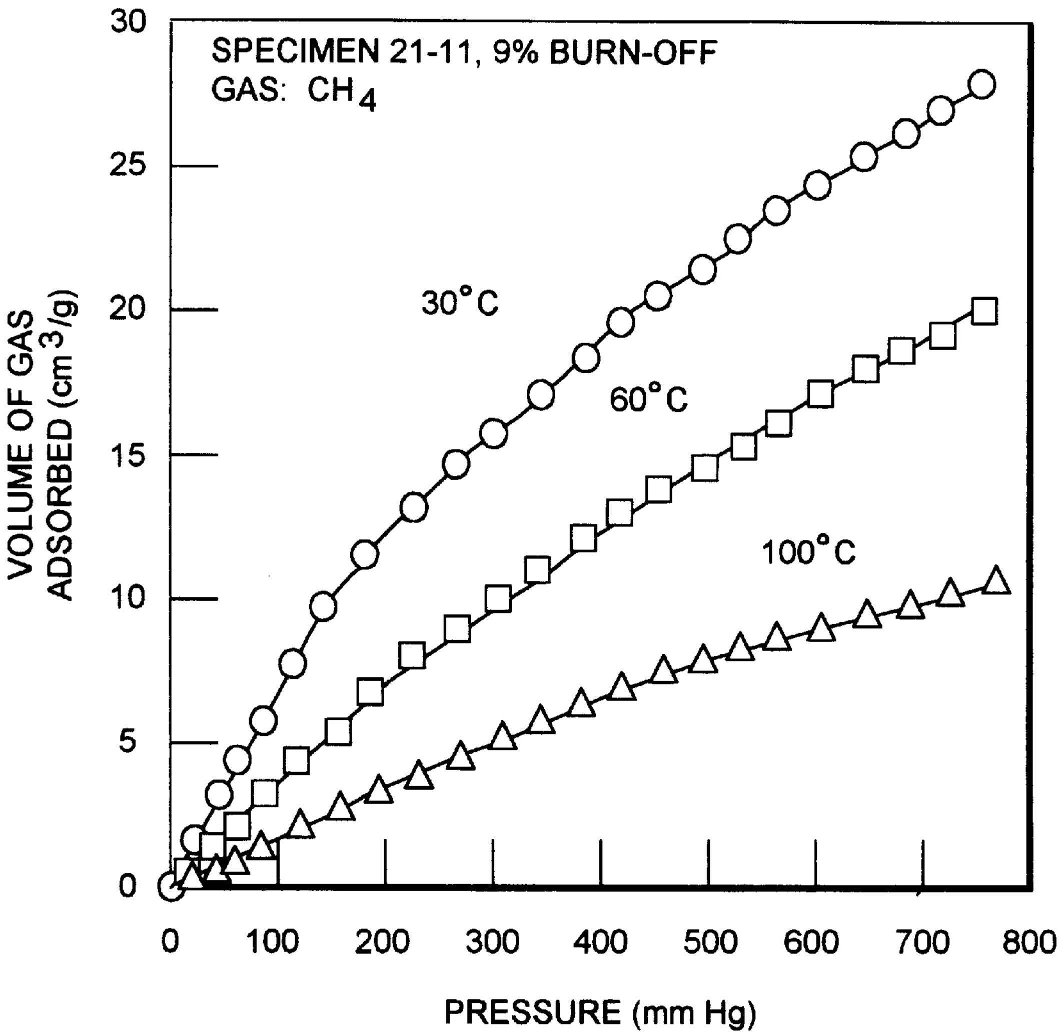
FIG. 3 illustrates volume of $CH_4$ adsorbed (in units of $cm^3/g$) as a function of pressure (in units of mm Hg) for a first example of a carbon fiber composite molecular sieve material, representing an embodiment of the present invention.
Figure 4:
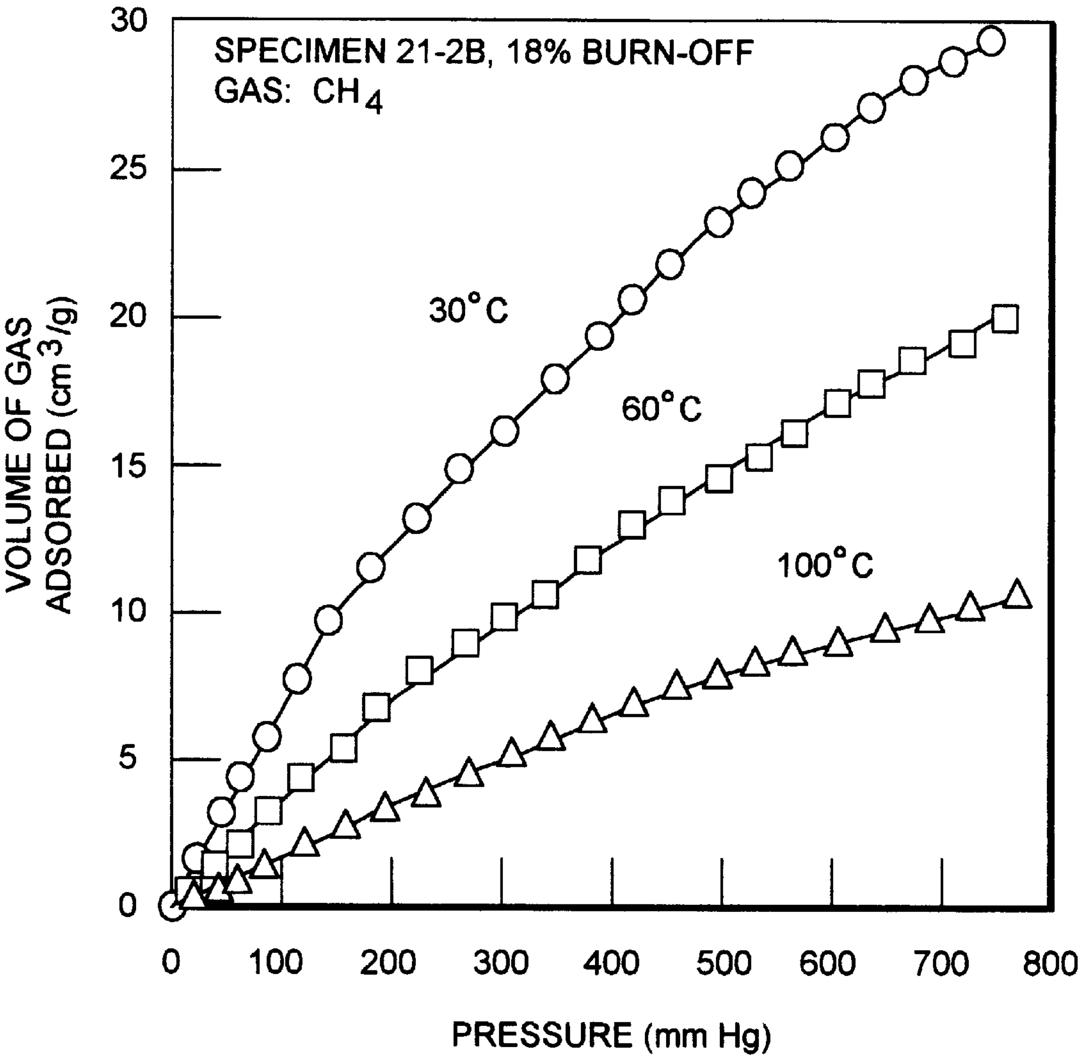
FIG. 4 illustrates volume of $CH_4$ adsorbed (in units of $cm^3/g$) as a function of pressure (in units of mm Hg) for a second example of a carbon fiber composite molecular sieve material, representing an embodiment of the present invention.
Figure 5:
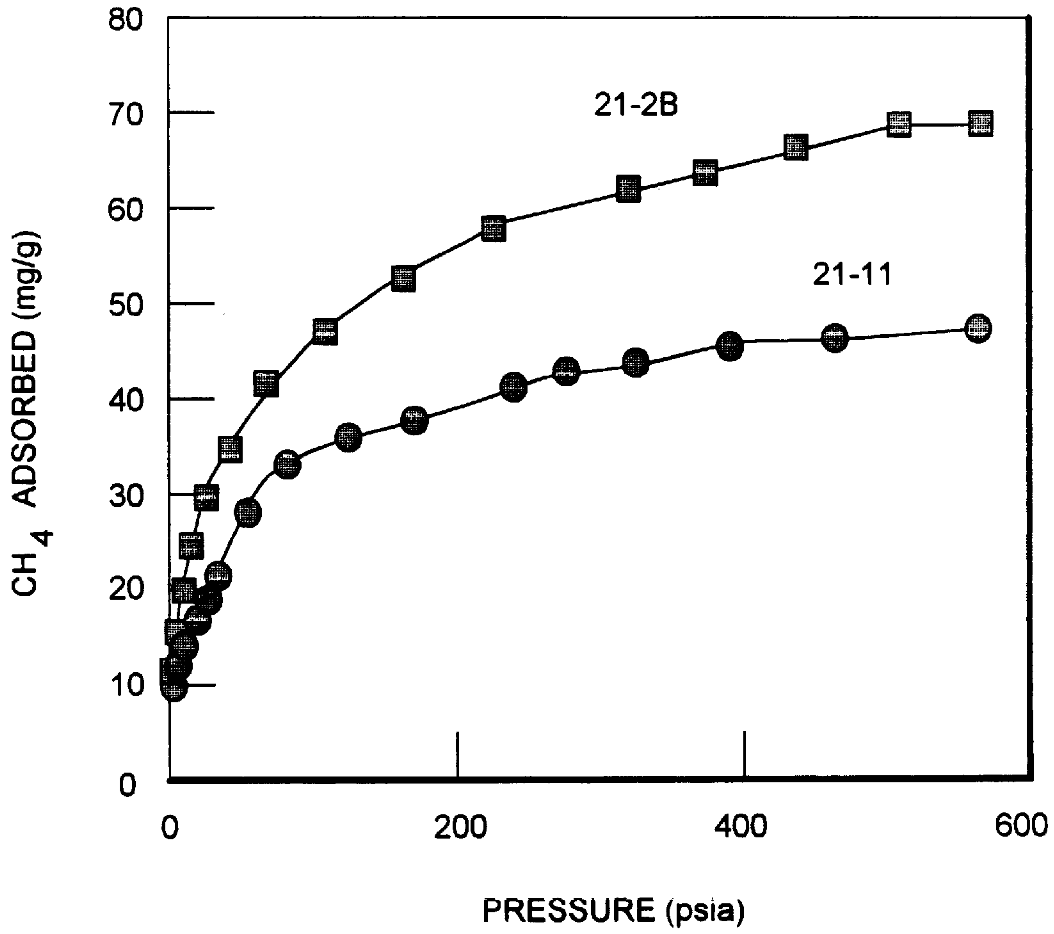
FIG. 5 illustrates $CH_4$ adsorbed (in units of mg/g) as a function of pressure (in units of psia) for the two examples of carbon fiber composite molecular sieve materials, representing an embodiment of the present invention.

Adsorption isotherms are indicators of the efficacy of this material in adsorbing methane, the principal constituent of natural gas. FIGS. 3–5 depict adsorption isotherms for methane adsorption on two different samples of the carbon fiber composite molecular sieve (CFCMS) material. FIGS. 3–5 demonstrate the ability to adjust the storage capacity of a CFCMS monolith as a function of pressure, temperature and porosity. The data shown in these figures does not indicate a particular maximum storage capacity in any material.

Example 1

A first example of a carbon fiber composite molecular sieve material was derived from isotropic pitch that was melt spun and formed into a monolith with phenolic resin. This first example, identified as specimen 21-11, was steam activated and characterized as having 9% burn-off.

Referring now to FIG. 3, the volume of $CH_4$ adsorbed (in units of $cm^3/g$) as a function of pressure (in units of mm Hg) is depicted for the first example. As the temperature is reduced, the volume of gas adsorbed per unit mass increases at any given pressure.

Example 2

A second example of a carbon fiber composite molecular sieve material was derived from the same isotropic pitch and similarly melt spun and formed into a monolith with phenolic resin. This second example, identified as specimen 21-2B, was steam activated and characterized as having 18% burn-off.

Referring now to FIG. 4, the volume of $CH_4$ adsorbed (in units of $cm^3/g$) as a function of pressure (in units of mm Hg) is depicted for the second example. Again, as the temperature is reduced, the volume of gas adsorbed per unit mass increases at any given pressure.

Referring now to FIG. 5, the $CH_4$ adsorption power of the first example is compared to the adsorption capacity of the second example. FIG. 5 illustrates $CH_4$ adsorbed (in units of mg/g) as a function of pressure (in units of psia) for the two examples of carbon fiber composite molecular sieve materials. It can be appreciated that higher adsorption is a function of higher burn-off percentage, the later being an indication of the extent of microporosity.

Practical Applications of the Invention

The invention can be used in many, and perhaps almost all, gas storage and delivery operations. As previously noted, the invention can be used for storage and delivery of natural gas and/or methane to a natural gas-fueled engine. Other uses of the invention include the separation of carbon dioxide from hydrogen gas streams resulting from natural gas reforming; removal of $CO_2$ from breathing air in confined spaces, for example in airplanes or submarines; hydrogen sulfide removal from synthesis gas produced by the gasification of coal; carbon dioxide capture from fuel cell recycle gas; and carbon dioxide capture from steam plant combustion emissions. There are virtually innumerable uses for the present invention described herein, all of which need not be detailed here.

Advantages of the Invention

With respect to conventional compressed natural gas storage systems, major advantages for the invention are related i) to safety, i.e., high pressure systems with large amounts of stored energy are avoided, and ii) to containment requirements, i.e., because of lower pressure in the adsorbed natural gas (ANG) system, thinner wall vessels may be used. With respect to conventional adsorptive natural gas storage systems using granular carbon, problems such as granule degradation and attrition, vessel shape constraints, etc., are avoided with this invention. Gas delivery using the electrical swing approach eliminates the need for changes in system parameters such as temperature and pressure and has the potential to increase the ratio of delivered to stored gas, which is problematic in pressure swing and thermal swing adsorption systems. Because the carbon fiber composite molecular sieve material can be molded into any shape, it is very helpful to designers. Additionally, carbon fiber composite molecular sieves do not form channels or create dust.

All the disclosed embodiments of the invention described herein can be realized and practiced without undue experimentation. Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. Accordingly, it will be appreciated by those skilled in the art that, within the scope of the appended claims, the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the electrical swing adsorption system described herein is a physically separate module, it will be manifest that the electrical swing adsorption system may be integrated into the apparatus with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

References

1. "Natural Gas Adsorbed on Carbon," (N. D. Parkyns and D. R. Quinn), *Porosity in Carbons*, Halsted Press, pages 291–325, (J. W. Patrick, ed., 1995).
2. "Passive $CO_2$ Removal Using a Carbon Fiber Composite Molecular Sieve," *Journal of Energy Conversion and Management,* 37(6–8), pages 947–954, (T. D. Burchell and R. R. Judkins, 1996).
3. *Marks Mechanical Engineering Handbook,* 10th ed., McGraw Hill, (Eugene A. Avallone et al. eds., 1996).
4. *The Electrical Engineering Handbook*, CRC Press, (Richard C. Dorf et al. eds., 1993).
5. *Perry's Chemical Engineers' Handbook,* 6th ed., McGraw Hill, (Robert H. Perry et al. eds., 1984).

What is claimed is:

1. An apparatus, comprising:

a two-chamber storage vessel comprising a pressure vessel connected to a low pressure tank via a check valve in a bulkhead;

an input manifold connected to said pressure vessel, an output manifold connected to said low pressure tank; an electrically conductive gas adsorptive material located within said pressure vessel; and an electric power supply electrically connected to said electrically conductive gas adsorptive material and adapted to pass a current through said electrically conductive gas adsorptive material.

2. The apparatus of claim 1, wherein said electrically conductive gas adsorptive material includes a rigid carbon fiber composite molecular sieve.

3. The apparatus of claim 2, wherein said rigid carbon fiber composite molecular sieve includes a continuous solid carbon fiber composite molecular sieve having a carbonized bulk density of from approximately 0.3 to approximately 0.4 g/cm$^3$.

4. The apparatus of claim 2, wherein said carbon fiber composite molecular sieve is made by consolidating carbon fibers, that are melt spun from an isotropic pitch, with a phenolic resin binder.

5. The apparatus of claim 1, wherein said electric power supply includes a variable voltage regulator and is adapted to desorb adsorbed gas from said electrically conductive gas adsorptive material.

6. An apparatus, comprising:

a two-chamber storage vessel comprising a pressure vessel connected to a low pressure tank via a check valve in a bulkhead;

an electrically conductive gas adsorptive material located within said pressure vessel; and an electric power supply electrically connected to said electrically conductive gas adsorptive material.

7. The apparatus of claim 6, further comprising a manifold connected to said pressure vessel.

8. The apparatus of claim 6, wherein said electrically conductive gas adsorptive material includes a rigid carbon fiber composite molecular sieve.

9. The apparatus of claim 8, wherein said rigid carbon fiber composite molecular sieve includes a continuous solid carbon fiber composite molecular sieve having a carbonized bulk density of from approximately 0.3 to approximately 0.4 g/cm$^3$.

10. The apparatus of claim 6, wherein said rigid carbon fiber composite molecular sieve is made by consolidating carbon fibers, that are melt spun from an isotropic pitch, with a phenolic resin binder.

11. The apparatus of claim 6, wherein said electric power supply includes a variable voltage regulator and is adapted to desorb adsorbed gas from said electrically conductive gas adsorptive material.

12. A method, comprising:

introducing gas into a two-chamber storage vessel;

passing said gas through a pressure vessel located within said storage vessel;

adsorbing said gas on an electrically conductive material positioned within said pressure vessel and electrically connected to an electrical power supply; and passing said gas to a low pressure tank also located within said storage vessel through a check valve in a bulkhead between said pressure vessel and said low pressure tank.

13. The method of claim 12, further comprising desorbing said gas from said electrically conductive gas adsorptive material by passing a current through said electrically conductive gas adsorptive material.

14. The method of claim 13, further comprising manifolding said gas and injecting said gas into an internal combustion engine.

15. The method of claim 12, wherein said electrically conductive gas adsorptive material includes a rigid carbon fiber composite molecular sieve.

16. The method of claim 15, wherein said rigid carbon fiber composite molecular sieve includes a continuous solid carbon fiber composite molecular sieve having a carbonized bulk density of from approximately 0.3 to approximately 0.4 g/cm$^3$.

17. The method of claim 12, wherein said gas includes at least one member selected from the group consisting of methane, ethane, propane, butane, pentane and hexane.

* * * * *